United States Patent
Yoshida et al.

(10) Patent No.: US 11,075,372 B2
(45) Date of Patent: Jul. 27, 2021

(54) ACTIVE MATERIAL AND BATTERY

(71) Applicant: TOYOTA JIDOSHA KABUSHIKI KAISHA, Aichi-ken (JP)

(72) Inventors: Jun Yoshida, Mishima (JP); Daichi Kosaka, Susono (JP); Takamasa Otomo, Gotemba (JP); Tetsuya Waseda, Susono (JP); Hideyuki Nakano, Nagakute (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 6 days.

(21) Appl. No.: 16/504,210

(22) Filed: Jul. 5, 2019

(65) Prior Publication Data

US 2020/0020929 A1    Jan. 16, 2020

(30) Foreign Application Priority Data

Jul. 13, 2018 (JP) .............................. JP2018-133309
Oct. 15, 2018 (JP) .............................. JP2018-194312

(51) Int. Cl.
  *H01M 4/00*    (2006.01)
  *H01M 4/134*   (2010.01)
  *H01M 4/131*   (2010.01)
  *H01M 4/1395*  (2010.01)
  (Continued)

(52) U.S. Cl.
  CPC .......... *H01M 4/134* (2013.01); *H01M 4/131* (2013.01); *H01M 4/1395* (2013.01);
  (Continued)

(58) Field of Classification Search
  CPC .......... H01M 10/0562; H01M 10/054; H01M 10/44; H01M 4/1395; H01M 4/134; H01M 4/621; C01B 33/06
  See application file for complete search history.

(56) References Cited

U.S. PATENT DOCUMENTS

2012/0021283 A1    1/2012  Chan et al.
2015/0188125 A1*   7/2015  Korgel ................. C01B 33/021
                                                429/338

(Continued)

FOREIGN PATENT DOCUMENTS

EP       0781727 A1      7/1997
JP       2017-59534 A    3/2017
KR       1020150060802 A 6/2015

OTHER PUBLICATIONS

Nicholas A. Wagner et al., "Electrochemical Cycling of Sodium-Filled Silicon Clathrate", Chemelectrochem Communications, Feb. 11, 2014, pp. 347-353, vol. a, No. 2, 7pp.

(Continued)

*Primary Examiner* — Cynthia H Kelly
*Assistant Examiner* — Monique M Wills
(74) *Attorney, Agent, or Firm* — Hauptman Ham, LLP

(57) ABSTRACT

A main object of the present disclosure is to provide a novel active material whose volume variation due to charge/discharge is small. The present disclosure achieves the object by providing an active material having a composition represented by $Na_xM_ySi_{46}$, wherein M is a metal element other than Na, x and y satisfy $0<x$, $0 \leq y$, $y \leq x$ and $0<x+y<8$, and comprising a crystal phase of a Type I silicon clathrate.

11 Claims, 9 Drawing Sheets

Type I silicon clathrate

(51) Int. Cl.
 H01M 4/38 (2006.01)
 H01M 4/62 (2006.01)
 H01M 10/0525 (2010.01)
 H01M 10/0562 (2010.01)
 H01M 10/44 (2006.01)
(52) U.S. Cl.
 CPC ........... H01M 4/386 (2013.01); H01M 4/621 (2013.01); H01M 10/0525 (2013.01); H01M 10/0562 (2013.01); H01M 10/44 (2013.01)

(56) References Cited

U.S. PATENT DOCUMENTS

| | | | |
|---|---|---|---|
| 2015/0243986 A1 | 8/2015 | Negi et al. | |
| 2015/0380724 A1* | 12/2015 | Chan | H01M 10/054 |
| | | | 429/50 |
| 2017/0077732 A1 | 3/2017 | Otaki et al. | |

OTHER PUBLICATIONS

Hitoshi Kawaji et al., "Superconductivity in the Silicon Clathrate Compound (Na, Ba)x Si46", The American Physical Society, vol. 74, No. 8, Feb. 20, 1995, pp. 1427-1429, 3pp.

Ganesh K. Ramachandran et al., "Synthesis and X-Ray Characterization of Silicon Clathrates", Journal of Solid State Chemistry 145, Jul. 1999, pp. 716-730, vol. 45, No. 2, 15pp.

T. Langer et al., "Electrochemical Lithiation of Silicon Clathrate-II", Journal of the Electrochemical Society, 159 (8), Jul. 20, 2002, p. A1318-A1322, 5pp.

\* cited by examiner

Type I silicon clathrate

Diamond-type silicon

Comp. Ex. 1

Example 1

ACTIVE MATERIAL AND BATTERY

RELATED APPLICATIONS

The present application claims priority to Japanese Patent Application No. 2018-133309 filed Jul 13, 2018 and Japanese Patent Application No. 2018-194312 filed Oct. 15, 2018, the disclosures of which are hereby incorporated by reference herein in their entirety.

TECHNICAL FIELD

The present disclosure relates to an active material and a battery.

BACKGROUND ART

In recent years, the development of a battery has been actively carried out. For example, the development of a battery used for an electric automobile or a hybrid automobile has been advanced in the automobile industry. Also, as the active material used for the battery, Si particles are known.

For example, Patent Literature 1 discloses an all solid state battery system comprising an all solid state battery including a cathode active material layer, a solid electrolyte layer, and an anode active material layer, and a controlling apparatus controlling charge and discharge voltage of the all solid state battery in use. Further, Patent Literature 1 discloses a silicon particle as an alloy based anode active material particle. Also, Patent Literature 1 discloses that a confining pressure is applied to a cell by a confining jig.

Patent Literature 2 discloses an electrode for a battery comprising silicon clathrate. Also, Non-patent Literature 1 discloses that a compound including a crystal phase of Type II silicon clathrate is used as an anode active material for a lithium ion battery.

CITATION LIST

Patent Literatures

Patent Literature 1: Japanese Patent Application Laid-Open (JP-A) No. 2017-059534
Patent Literature 2: United States Patent Application Publication No. 2012/0021283

Non-Patent Literature

Non-patent Literature 1: Thorsten Langer et al., "Electrochemical Lithiation of Silicon Clathrate-II", Journal of The Electrochemical Society, 159(8) A1318-A1322 (2012)

SUMMARY OF DISCLOSURE

Technical Problem

A Si particle is high in theoretical capacity and is effective for increasing the energy density of a battery. Meanwhile, the volume of the Si particle varies greatly upon charge and discharge.

The present disclosure has been made in view of the above circumstances, and a main object thereof is to provide a novel active material whose volume variation due to charge/discharge is small. Incidentally, the active material in the present disclosure may be referred to as a silicon clathrate compound in some cases.

Solution to Problem

In order to achieve the object, the present disclosure provides an active material having a composition represented by $Na_xM_ySi_{46}$, wherein M is a metal element other than Na, x and y satisfy $0<x$, $0 \leq y$, $y \leq x$ and $0<x+y<8$, and comprising a crystal phase of a Type I silicon clathrate.

According to the present disclosure, by having the specific composition and the crystal phase, the volume variation of the active material due to charge/discharge may be decreased.

In the disclosure, the active material may comprise the crystal phase of the Type I silicon clathrate as a main phase.

In the disclosure, the crystal phase of the Type I silicon clathrate may have a peak at a position of $2\theta = 30.33° \pm 1.00°$, $31.60° \pm 1.00°$, $32.82° \pm 1.00°$, $52.39° \pm 1.00°$ and $55.49° \pm 1.00°$ in X-ray diffraction measurement using a CuKα ray.

In the disclosure, the active material may comprise no Si crystal phase of a diamond-type.

In the disclosure, the active material may comprise a Si crystal phase of a diamond-type, the Si crystal phase of the diamond-type may have a peak at a position of $2\theta = 28.44° \pm 1.00°$ in X-ray diffraction measurement using a CuKα ray, and when a diffraction intensity of the peak at $2\theta = 32.82° \pm 1.00°$ is regarded as $I_A$, and a diffraction intensity of the peak at $2\theta = 28.44° \pm 1.00°$ is regarded as $I_B$, $I_B/I_A$ may be more than 0, and 0.1 or less.

In the disclosure, the x and the y may satisfy $2.9 \leq x$, $2.9 \leq x+y \leq 7.1$.

The present disclosure also provides a battery comprising a cathode layer, an electrolyte layer, and an anode layer, in this order, and the anode layer includes the above described active material.

According to the present disclosure, since the anode layer includes the above described active material (silicon clathrate compound), the volume variation of the battery due to charge/discharge may be decreased. Therefore, a battery having good battery properties such as capacity may be obtained.

In the disclosure, the electrolyte layer may include an inorganic solid electrolyte.

In the disclosure, the electrolyte layer may include a liquid electrolyte.

In the disclosure, the battery may be a lithium ion battery.
In the disclosure, the battery may be a sodium ion battery.

Advantageous Effects of Disclosure

The active material in the present disclosure exhibits an effect that the volume variation due to charge/discharge is small.

DESCRIPTION OF EMBODIMENTS

An active material and a battery in the present disclosure will be hereinafter described in details.

A. Active Material

The active material in the present disclosure has a composition represented by $Na_xM_ySi_{46}$, wherein M is a metal element other than Na, x and y satisfy $0<x$, $0\leq y$, $y\leq x$ and $0<x+y<8$, and comprises a crystal phase of a Type I silicon clathrate.

According to the present disclosure, by having the specific composition and the crystal phase, the volume variation of the active material due to charge/discharge may be decreased. Since the volume variation of the active material in the present disclosure due to charge/discharge is small, a battery having good battery properties such as capacity and cycle property may be obtained, for example. Particularly for an all solid state battery, it is necessary to apply a high confining pressure, generally, in order to suppress the volume variation due to charge/discharge. However, by using the active material in the present disclosure, the confining pressure may be reduced; as the result, the enlargement of the confining jig may be suppressed.

Figure 1A:
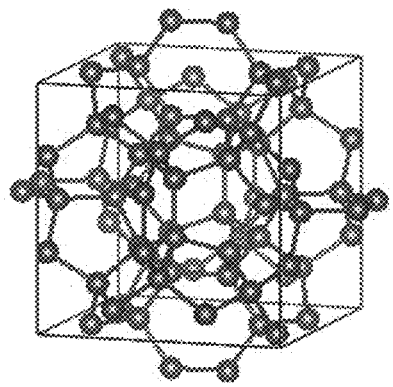
FIGS. 1A and 1B are explanatory drawings illustrating an active material in the present disclosure.
Figure 1B:
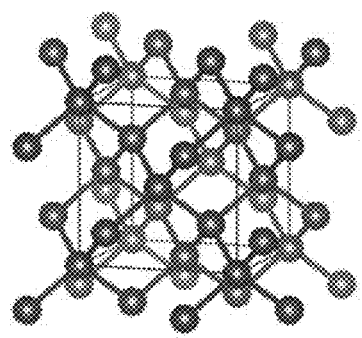

Also, the active material in the present disclosure comprises the crystal phase of a Type I silicon clathrate. In the crystal phase of Type I silicon clathrate, as shown in FIG. 1A, a polyhedron including a pentagon or a hexagon is formed with a plural of Si elements. The polyhedron has a space within thereof that is capable of including a metal ion such as a Li ion. By the metal ion being inserted into this space, the volume variation due to charge/discharge may be suppressed. Also, since the crystal phase of Type I silicon clathrate has the space within thereof that is capable of including the metal ion, there is an advantage that the crystal structure is likely to be maintained although charged/discharged repeatedly. Incidentally, a usual Si particle includes the crystal phase of a diamond-type. In the crystal phase of the diamond-type, as shown in FIG. 1B, a tetrahedron is formed with a plural of Si elements. Since the tetrahedron does not have a space within thereof that is capable of including the metal ion such as a Li ion, the volume variation due to charge/discharge is large.

Patent Literature 2 discloses an electrode for a battery including a silicon clathrate. Meanwhile, the silicon clathrate is not actually synthesized in Patent Literature 2, and the stress-strain and the like of various LiSi compounds are evaluated by the way of simulations. Incidentally, Patent Literature 2 neither discloses nor suggests a silicon clathrate including a Na element.

Also Non-patent Literature 1 discloses to use a compound including a crystal phase of Type II silicon clathrate as an anode active material of a lithium ion battery. More specifically, discloses a lithium ion battery using a compound including a crystal phase of Type II silicon clathrate having a composition represented by $Na_xSi_{136}$, as an anode active material. Meanwhile, Non-patent Literature 1 discloses in A1318, left column line 8 to line 12 that $Na_xSi_{136}$ (Type II silicon clathrate) may be obtained by desorbing Na from $Na_8Si_{46}$ (Type I silicon clathrate). In other words, Non-patent Literature 1 neither discloses nor suggests that the crystal phase of Type I silicon clathrate may be maintained while desorbing Na.

The active material in the present disclosure is considered to be a novel active material from the point of comprising the crystal phase of Type I silicon clathrate while having the composition including less Na than $Na_8Si_{46}$. The reasons for obtaining such active material may include the point that it was synthesized under the later described conditions. Particularly, since the active material in the present disclosure has the composition including less Na than $Na_8Si_{46}$, more metal ions such as Li ion may be included. Also in this point, the volume variation due to charge/discharge may be suppressed. Also, the active material in the present disclosure comprises the crystal phase of Type I silicon clathrate. Since Si polyhedron with large space is included in the crystal phase of Type I silicon clathrate at higher rate than the crystal phase of Type II silicon clathrate, it has advantages in the points of suppressing the volume expansion upon metal ion insertion and maintaining the crystal structure.

The active material in the present disclosure has a composition represented by $Na_xM_ySi_{46}$, wherein M is a metal element other than Na, x and y satisfy $0<x$, $0\leq y$, $y\leq x$ and $0<x+y<8$. M is a metal element other than Na, and examples thereof may include an alkali metal element. Examples of the alkali metal element may include a Li element, a K element, a Rb element, and a Cs element. Also, other examples of M may include an alkaline earth metal element. Examples of the alkaline earth metal element may include a Mg element, a Ca element, a Sr element, and a Ba element. Further, other examples of M may include Group 11 elements such as a Cu element, a Ag element, and a Au element; Group 12 elements such as a Zn element; Group 13 elements such as a B element, an Al element, a Ga element, an In element, and a Tl element; Group 14 elements such as a Ge element; Group 15 elements such as a Sb element; Group 16 elements such as a Te element; lanthanoids such as a La element and an Eu element. Also, as M, transition metal elements such as a Ni element may be used.

The x usually satisfies $0<x$, may satisfy $0.1\leq x$, may satisfy $0.5\leq x$, may satisfy $1.5\leq x$, may satisfy $2.5\leq x$, and may satisfy $2.9\leq x$. Meanwhile, the x satisfies, for example, $x<8$, may satisfy $x\leq 7.5$, may satisfy $x\leq 7.1$, and may satisfy $x\leq 6$. Also, the y may be 0, and may satisfy $0<y$. Also, the x and the y satisfy y≤x. The mole proportion of the x to the total of the x and the y ((x/(x+y)) is usually 0.5 or more, may be 0.7 or more, and may be 0.9 or more.

The total of the x and the y (x+y) usually satisfies 0<x+y, may satisfy 0.1≤x+y, may satisfy 0.5≤x+y, may satisfy 1.5≤x+y, may satisfy 2.5≤x+y, and may satisfy 2.9≤x+y. Meanwhile, x+y usually satisfies x+y<8, may satisfy x+y≤7.5, may satisfy x+y=7.1, and may satisfy x+y≤6.

The active material in the present disclosure comprises the crystal phase of Type I silicon clathrate. Particularly, the active material in the present disclosure preferably comprises the crystal phase of Type I silicon clathrate as a main phase. "Comprising the crystal phase of Type I silicon clathrate as a main phase" means that, among the peaks observed in X-ray diffraction measurement, one of the peak belonging to the crystal phase of Type I silicon clathrate is the peak with the strongest diffraction intensity. The crystal phase of Type I silicon clathrate usually belongs to the space group (Pm-3n). Incidentally, the crystal phase of Type I silicon clathrate includes at least a Na element and a Si element, may include the M element, and may include no M element.

The crystal phase of the Type I silicon clathrate has a typical peak at a position of 2θ=19.44°, 21.32°, 30.33°, 31.60°, 32.82°, 36.29°, 52.39°, and 55.49° in X-ray diffraction measurement using a CuKα ray. These peak positions may vary respectively in a range of ±1.00°, may vary in a range of ±0.50°, and may vary in a range of ±0.30°. Incidentally, when the metal ion such as a lithium ion is inserted into the crystal phase of Type I silicon clathrate, for example, the peak may be shifted in some cases. Therefore, the XRD measurement is preferably carried out in the state that the metal ion is not inserted.

Also, the active material in the present disclosure preferably comprises no Si crystal phase of a diamond-type, but may comprise slightly. The Si crystal phase of the diamond-type has a typical peak at a position of 2θ=28.44°, 47.31°, 56.10°, 69.17°, and 76.37° in X-ray diffraction measurement using a CuKα ray. These peak positions may vary respectively in a range of ±1.00°, may vary in a range of ±0.50°, and may vary in a range of ±0.30°.

Here, the diffraction intensity of the peak at 2θ=32.82°±1.00° in the crystal phase of Type I silicon clathrate is regarded as $I_A$, and a diffraction intensity of the peak at 2θ=28.44°±1.00° in the Si crystal phase of the diamond-type is regarded as $I_B$. The proportion of $I_B$ to $I_A$ ($I_B/I_A$) is preferably small. The value of $I_B/I_A$ is, for example, 1.2 or less, may be 1.0 or less, may be 0.5 or less, may be 0.3 or less, may be 0.2 or less, may be 0.1 or less, may be 0.08 or less, and may be 0.06 or less. Meanwhile the value of $I_B/I_A$ may be 0, and may be more than 0.

Also, the active material in the present disclosure preferably comprises no crystal phase of Type II silicon clathrate, but may comprise slightly. The crystal phase of Type II silicon clathrate usually belongs to the space group (Fd-3m). The crystal phase of Type II silicon clathrate has a typical peak at a position of 2θ=20.09°, 21.00°, 26.51°, 31.72°, 36.26°, and 53.01° in X-ray diffraction measurement using a CuKα ray. These peak positions may vary respectively in a range of ±1.00°, may vary in a range of ±0.50°, and may vary in a range of ±0.30°.

Here, the diffraction intensity of the peak at 2θ=26.51°±1.00° in the crystal phase of Type II silicon clathrate is regarded as $I_C$. The proportion of $I_C$ to $I_A$ ($I_C/I_A$) is preferably small. The value of $I_C/I_A$ is, for example, 1 or less, may be 0.8 or less, may be 0.6 or less, may be 0.4 or less, may be 0.2 or less, and may be 0.1 or less. Meanwhile the value of $I_C/I_A$ may be 0, and may be more than 0.

Also, the active material in the present disclosure preferably comprises no Zintl phase, but may comprise slightly. The Zintl phase has a typical peak at a position of 2θ=16.10°, 16.56°, 17.64°, 20.16°, 27.96°, 33.60°, 35.68°, 40.22°, and 41.14° in X-ray diffraction measurement using a CuKα ray. These peak positions may vary respectively in a range of ±1.00°, may vary in a range of ±0.50°, and may vary in a range of ±0.30°.

Here, the diffraction intensity of the peak at 2θ=33.60°±1.00° in the Zintl phase is regarded as $I_D$. The proportion of $I_D$ to $I_A$ ($I_D/I_A$) is preferably small. The value of $I_D/I_A$ is, for example, 0.5 or less, may be 0.25 or less, may be 0.1 or less, and may be 0.05 or less. Meanwhile the value of $I_D/I_A$ may be 0, and may be more than 0.

Examples of the shape of the active material in the present disclosure may include a granular shape. The average primary particle size of the active material is, for example, 50 nm or more, may be 100 nm or more, and may be 150 nm or more. Meanwhile, the average primary particle size of the active material is, for example, 3000 nm or less, 1500 nm or less, and may be 1000 nm or less. Also, the average secondary particle size of the active material is, for example, 1 μm or more, may be 2 μm or more, may be 5 μm or more, and may be 7 μm or more. Meanwhile, the average secondary particle size of the active material is, for example, 60 μm or less, and may be 40 μm or less. Incidentally, the average primary particle size and the average secondary particle size may be determined by observation with a SEM (scanning electron microscope), for example. The number of the sample is preferably large; for example, 20 or more, may be 50 or more, and may be 100 or more. The average primary particle size and the average secondary particle size may be adjusted appropriately by, for example, appropriately changing the manufacturing conditions of the active material, and by carrying out a classifying treatment.

Also, the active material in the present disclosure is usually used for a battery. The battery is described in detail in "B. Battery" later. Also, the active material in the present disclosure may be an anode active material, may be a cathode active material, and the former is preferable.

The method for producing the active material in the present disclosure is not particularly limited, and examples may include a method including a first heat treatment step of synthesizing NaSi compound including Zintl phase by carrying out a heat treatment to a mixture including a Si particle and a simple substance of Na (metallic Na), and a second heat treatment step of desorbing the Na by carrying out a heat treatment to the NaSi compound under reduced pressure.

The proportion of the Si particle and the simple substance of Na in the first heat treatment step is not particularly limited, and to 1 part by mole of the Si particle, the simple substance of Na is, for example, 0.8 parts by mole or more, may be 1 part by mole or more, and may be 1.1 parts by mole or more. Meanwhile, to 1 part by mole of the Si particle, the simple substance of Na is, for example, 1.5 parts by mole or less, may be 1.3 parts by mole or less, and may be 1.2 parts by mole or less.

The heat treatment temperature in the first heat treatment step is, for example, 500° C. or more, and 1000° C. or less. Also, the heat treatment time in the first heat treatment step is, for example, 1 hour or more, and 50 hours or less. Particularly, the desired active material is likely to be obtained by carrying out the heat treatment under at least one of the following conditions; approximately 700° C. (for example, 650° C. or more, and 750° C. or less) and approximately 20 hours (for example, 15 hours or more, and 25 hours or less).

In the second heat treatment step, the pressure upon the heat treatment is, for example, 10 Pa or less, may be 1 Pa or less, and may be 0.1 Pa or less. Also, the heat treatment temperature in the second heat treatment step is, for example, 100° C. or more, and 650° C. or less. Also, the heat treatment time in the second heat treatment step is, for example, 30 minutes or more, and 20 hours or less. Particularly, the desired active material is likely to be obtained by carrying out the heat treatment under at least one of the following conditions; approximately 450° C. (for example, 400° C. or more, and 500° C. or less) and approximately 5 hours (for example, 2 hours or more, and 8 hours or less). The active material in the present disclosure may be obtained in the second heat treatment step.

B. Battery

Figure 2:
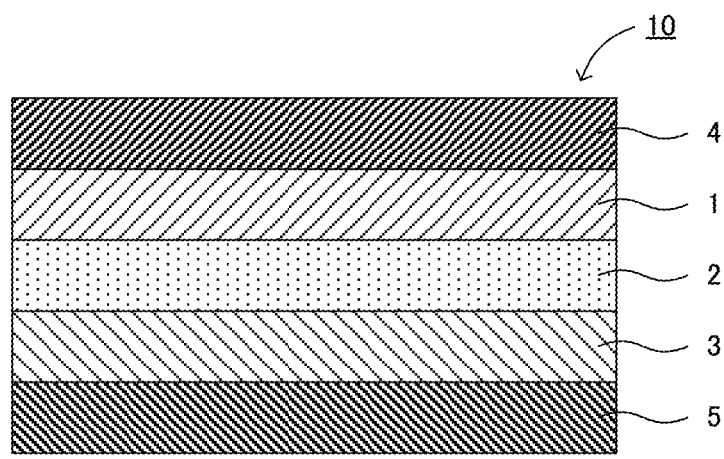
FIG. 2 is a schematic cross-sectional view illustrating an example of a battery in the present disclosure.

FIG. 2 is a schematic cross-sectional view illustrating an example of a battery in the present disclosure. Battery 10 shown in FIG. 2 comprises cathode layer 1, electrolyte layer 2, and anode layer 3, in this order in the thickness direction. Further, battery 10 comprises cathode current collector 4 for collecting currents of cathode layer 1, and anode current collector 5 for collecting currents of anode layer 3. Incidentally, battery 10 may comprise a known outer packing, although not particularly shown in the figure. In the present disclosure, a characteristic is that anode layer 3 includes the active material described in "A. Active material" above.

According to the present disclosure, since the anode layer includes the above described active material (silicon clathrate compound), the volume variation of the battery due to charge/discharge may be decreased. Therefore, a battery having good battery properties such as capacity may be obtained.

1. Anode Layer

The anode layer is a layer including at least an anode active material. In the present disclosure, the active material (silicon clathrate compound) described in "A. Active material" above is used as the anode active material.

The anode layer may include only the silicon clathrate compound as the anode active material, and may include other active material. In the latter case, the proportion of the silicon clathrate compound in the total anode active material may be, for example, 50% by weight or more, may be 70% by weight or more, and may be 90% by weight or more.

The proportion of the anode active material in the anode layer is, for example, 20% by weight or more, may be 30% by weight or more, and may be 40% by weight or more. Meanwhile, the proportion of the anode active material is, for example, 80% by weight or less, may be 70% by weight or less, and may be 60% by weight or less.

Also, the anode layer may include at least one of an electrolyte, a conductive material, and a binder as required. The electrolyte will be described in detail in "3. Electrolyte layer" later.

Examples of the conductive material may include a carbon material, a metal particle, and a conductive polymer. Examples of the carbon material may include particulate carbon materials such as acetylene black (AB) and Ketjen black (KB); and fibrous carbon materials such as carbon fiber, carbon nanotube (CNT), and carbon nanofiber (CNF). Examples of the metal particle may include particles such as Ni, Cu, Fe and SUS. Examples of the conductive polymer may include polyacetylene based polymers such as polyacetylene; polyaniline based polymers such as polyaniline; polypyrrole based polymers such as copolymer of 3-methyl-4-pyrrolecarboxylic acid ethyl ester and 3-methyl-4-pyrrolecarboxylic acid butyl ester; polythiophene based polymers such as PEDOT obtained by polymerizing 3,4-ethylenedioxythiophene; polyphenylene based polymers such as poly p-phenylene; polyphenylene vinylene based polymers such as poly p-phenylene vinylene; polyacene based polymers such as polyacene; and polyazulene based polymers such as polyazulene.

Examples of the binder may include rubber-based binders such as butadiene rubber, butadiene hydrorubber, styrene butadiene rubber (SBR), styrene butadiene hydrorubber, nitrile-butadiene rubber, nitrile-butadiene hydrorubber, and ethylene-propylene rubber; fluorine-based binders such as polyvinylidene fluoride (PVDF), polyvinylidene fluoride-polyhexafluoropropylene copolymer (PVDF-HFP), polytetrafluoroethylene, and fluororubber. Also, other examples of the binder may include polyolefin based thermoplastic resins such as polyethylene, polypropylene, and polystyrene; imide based resins such as polyimide and polyamide-imide; amide based resins such as polyamide; acrylate resins such as polymethyl acrylate, polyethyl acrylate, polypropyl acrylate, polybutyl acrylate, polyhexyl acrylate, poly2-ethylhexyl acrylate, polydecyl acrylate, and polyacrylic acid; methacrylate resins such as polymethyl methacrylate, polyethyl methacrylate, polybutyl methacrylate, poly2-ethylhexyl methacrylate, and polymethacrylic acid; polycarboxylic acid such as polyitaconic acid, polycrotonic acid, polyfumaric acid, polyangelic acid, and carboxymethyl cellulose.

Also, other examples of the binder may include polyethylene oxide, polypropylene oxide, polyacrylonitrile, polyethylene glycol dimethacrylate, polyethylene glycol acrylate, polyethylene vinyl acetate, polyglycidol, polysiloxane, polydimethylsiloxane, polyvinyl acetate, polyvinyl alcohol, polycarbonate, polyamine, polyalkyl carbonate, polynitrile, polydiene, polyphosphazene, unsaturated polyesters obtained by copolymerizing maleic anhydride and glycols, and polyethylene oxide derivatives including a substituent group. Also, a copolymer obtained by copolymerizing two kinds or more monomers constituting the polymers specifically described above may be selected as the binder. Also, polysaccharides such as glycogen, cellulose, chitin, agarose, carrageenan, heparin, hyaluronan, pectin, amylopectin, xyloglucan, and amylose may be used as the binder. Also, these binders may also be used as a dispersion fluid such as an emulsion.

The thickness of the anode layer is, for example, 0.1 μm or more and 1000 μm or less.

2. Cathode Layer

The cathode layer is a layer containing at least a cathode active material. Also, the cathode layer may contain at least one of an electrolyte, a conductive material, and a binder, as necessary.

Examples of the cathode active material may include an oxide active material. Examples of the oxide active material used for a lithium ion battery may include rock salt bed type active materials such as $LiCoO_2$, $LiMnO_2$, $LiNiO_2$, $LiVO_2$, $LiNi_{1/3}Co_{1/3}Mn_{1/3}O_2$, $LiNi_{0.8}Co_{0.15}Al_{0.05}O_2$, $LiNi_{0.5}Mn_{0.5}O_2$, $LiNi_{0.33}Mn_{0.67}O_2$, $LiNi_{0.8}Co_{0.1}Mn_{0.1}O_2$, $LiNi_{0.6}Co_{0.2}Mn_{0.2}O_2$, $LiNi_{0.5}Co_{0.2}Mn_{0.3}O_2$; active materials having Li excess composition and utilizing oxygen redox partially in charge/discharge such as $Li_2MnO_3$, $Li_{1.2}Mn_{0.54}Co_{0.13}Ni_{0.13}O_2$, $Li_{1.3}Nb_{0.3}Mn_{0.4}O_2$, $Li_{1.2}Ti_{0.4}Mn_{0.4}O_2$, and $Li_{1.3}Nb_{0.3}Fe_{0.4}O_2$; spinel type active materials such as $LiMn_2O_4$, $Li_4Ti_5O_{12}$, and $Li(Ni_{0.5}Mn_{1.5})O_4$; olivine type active materials such as $LiFePO_4$, $LiMnPO_4$, $LiNiPO_4$, and $LiCoPO_4$; nasicon type active materials such as $Li_3V_2(PO_4)_3$; silicate type active materials such as $Li_2FeSiO_4$; pyrochlore type active materials such as $LiFeP_2O_7$. Also, as the oxide active material, $LiVPO_4F$ and $LiFeSO_4F$ may be used.

Also, a coating layer including a Li ion conductive oxide may be formed on the surface of the oxide active material. The reason therefor is to inhibit the reaction of the oxide active material with the solid electrolyte (particularly sulfide solid electrolyte). Examples of the Li ion conductive oxide may include lithium niobates such as $LiNbO_3$; lithium titanates such as $Li_4Ti_5O_{12}$; lithium tungstates such as $LiWO_3$; lithium tantalites such as $LiTaO_3$; lithium molybdates such as $LiMoO_3$; and lithium phosphates such as $Li_3PO_4$. Further, the later described oxide solid electrolyte may be used as the Li ion conductive oxide. The thickness of the coating layer is, for example, 1 nm or more. Meanwhile, the thickness of the coating layer is, for example, 30 nm or less, and may be 15 nm or less.

Meanwhile, examples of the oxide active material used for a sodium ion battery may include an $O_3$ type layered active material, a $P_2$ type layered active material, a $P_3$ type layered active material, and alluaudite type active material. Specific examples of such oxide active materials may include $NaFeO_2$, $NaNiO_2$, $NaCoO_2$, $NaMnO_2$, $NaVO_2$, $Na(Ni_XMn_{1-X})O_2$ (0<X<1), $Na(Fe_XMn_{1-X})O_2$ (0<X<1), $Na(Ni_XCo_YMn_{1-X-Y})O_2$ (0<X<1, 0<Y<1), $Na_zFeO_2$ (0.6<z<1), $NazNiO_2$ (0.6<z<1), $NazCoO_2$ (0.6<z<1), $Na_zMnO_2$ (0.6<z<1), $Na_zVO_2$ (0.6<z<1), $Na_z(Ni_XMn_{1-X})O_2$ (0<X<1, 0.6<z<1), $Na_z(Fe_XMn_{1-X})O_2$, (0<X<1, 0.6<z<1), $Na_z(Ni_XCo_YMn_{1-X-Y})O_2$ (0<X<1, 0<Y<1, 0.6<z<1), $NaFeO_2$, $NaNiO_2$, $NaCoO_2$, $NaMnO_2$, $NaVO_2$, $Na(Ni_XMn_{1-X})O_2$ (0<X<1), $Na(Fe_XMn_{1-X})O_2$ (0<X<1), $Na(Ni_XCo_YMn_{1-X-Y})O_2$ (0<X<1, 0<Y<1), $Na_2Fe_2(SO_4)_3$, $NaVPO_4F$, $Na_2FePO_4F$, $Na_3V_2(PO_4)_3$, $Na_4M_3((PO_4)_2P_2O_7$ (M is at least one kind of Co, Ni, Fe, and Mn).

Examples of the shape of the cathode active material may include a granular shape. The average particle size ($D_{50}$) of the cathode active material is not particularly limited; is, for example, 10 nm or more, and may be 100 nm or more. Meanwhile, the average particle size ($D_{50}$) of the cathode active material is, for example, 50 μm or less, and may be 20 μm or less. Incidentally, the average particle size ($D_{50}$) may be calculated from the measurement by, for example, a laser diffraction type particle size distribution meter, and a scanning electron microscope (SEM).

The proportion of the cathode active material in the cathode layer is, for example, 20% by weight or more, may be 30% by weight or more, and may be 40% by weight or more. Meanwhile, the proportion of the cathode active material is, for example, 80% by weight or less, may be 70% by weight or less, and may be 60% by weight or less.

The conductive material and the binder used for the cathode layer may be in the same contents as those described in "1. Anode layer" above; thus, the description herein is omitted. Meanwhile, the electrolyte used for the cathode layer will be described in detail in "3. Electrolyte layer" later.

The thickness of the cathode layer is, for example, 0.1 μm or more and 1000 μm or less.

3. Electrolyte Layer

The electrolyte layer is a layer formed between the cathode layer and the anode layer, and includes at least an electrolyte. The electrolyte may be a solid electrolyte, may be an electrolyte solution (liquid electrolyte), and may be a mixture thereof. The kind of the electrolyte is not particularly limited, and may be appropriately selected according to the kind of the battery.

Typical examples of the solid electrolyte may include inorganic solid electrolytes such as sulfide solid electrolyte, oxide solid electrolyte, nitride solid electrolyte, and halide solid electrolyte; and organic polymer electrolytes such as polymer electrolyte.

Examples of the sulfide solid electrolyte having lithium ion conductivity may include solid electrolyte including a Li element, an X element (X is at least one kind of P, As, Sb, Si, Ge, Sn, B, Al, Ga, and In) and a S element. Also, the sulfide solid electrolyte may further include at least either one of an O element and a halogen element. Examples of the halogen element may include a F element, a Cl element, a Br element, and an I element.

The sulfide solid electrolyte may be a glass based sulfide solid electrolyte, may be a glass ceramic based sulfide solid electrolyte, and may be a crystalline sulfide solid electrolyte.

The glass based sulfide solid electrolyte is preferably provided with an ion conductor including a Li element, an A element (A is at least one kind of P, As, Sb, Si, Ge, Al, and B) and a S element. Further, the ion conductor is preferably high in Li content. Also, the ion conductor preferably has an anion structure of an ortho composition ($PS_4^{3-}$ structure, $SiS_4^{4-}$ structure, $GeS_4^{4-}$ structure, $AlS_3^{3-}$ structure, and $BS_3^{3-}$ structure) as the main component of the anion. The reason therefor is to allow the ion conductor to have high chemical stability. The proportion of the anion structure of an ortho composition with respect to all the anion structures in the ion conductor is preferably 70 mol % or more, and more preferably 90 mol % or more. The proportion of the anion structure of an ortho composition may be determined by methods such as a Raman spectroscopy, NMR, and XPS.

The glass based sulfide solid electrolyte may contain lithium halide in addition to the ion conductor. Examples of the lithium halide may include LiF, LiCl, LiBr, and LiI; among them, LiCl, LiBr, and LiI are preferable. The proportion of LiX (X=F, I, Cl, and Br) in the glass based sulfide solid electrolyte is, for example, 5 mol % or more, and may be 15 mol % or more. Meanwhile, the proportion of the LiX is, for example, and 30 mol % or less, and may be 25 mol % or less.

The glass ceramic based sulfide solid electrolyte may be obtained by, for example, carrying out a heat treatment to the above described glass based sulfide solid electrolyte. Specific examples of the glass ceramic based sulfide solid electrolyte may include $xLi_2S \cdot (100-x)P_2S_5$ (70≤x≤80), $yLiI \cdot zLiBr \cdot (100-y-z)(xLi_2S \cdot (100-x)P_2S_5)$ (70≤x≤80), 0≤y≤30, 0≤z≤30).

Examples of the crystalline sulfide solid electrolyte may include thio-LISICON type solid electrolyte, LGPS type solid electrolyte, and argyrodite type solid electrolyte. Examples of the thio-LISICON type solid electrolyte may include $Li_{(4-x)}Ge_{(1-x)}P_xP_4$ (x satisfies 0<x<1). Also, examples of the LGPS type solid electrolyte may include $Li_{(4-x)}Ge_{(1-x)}P_xS_4$ (x satisfies 0<x<1). Incidentally, Sb, Si, Sn, B, Al, Ga, In, Ti, Zr, V, and Nb may be used instead of at least either one of Ge and P. Also, a part of Li may be substituted with Na, K, Mg, Ca, and Zn. Further, a part of S may be substituted with a halogen (F, Cl, Br, and I). Examples of the argyrodite type solid electrolyte may include $Li_{7-x-2y}PS_{6-x-y}X_y$, $Li_{8-x-2y}SiS_{6-x-y}X_y$, and $Li_{8-x-2y}GeS_{6-x-y}X_y$. Incidentally, X is at least one kind of F, Cl, Br, and I, and x and y respectively satisfies 0<x, 0<y.

Also, examples of the oxide solid electrolyte having lithium ion conductivity may include solid electrolytes containing a Li element, a Y element (Y is at least one kind of Nb, B, Al, Si, P, Ti, Zr, Mo, W and S), and an O element. Specific examples may include garnet type solid electrolytes such as $Li_7La_3Zr_2O_{12}$, $Li_{7-x}La_3(Zr_{2-x}Nb_x)O_{12}$, (0≤x≤2), $Li_5La_3Nb_2O_{12}$; perovskite type solid electrolyte such as (Li, La)$TiO_3$, (Li, La)$NbO_3$, (Li, Sr) (Ta, Zr)$O_3$; nasicon type solid electrolytes such as Li(Al, Ti) $(PO_4)_3$. Li(Al, Ga) $(PO_4)_3$; Li—P—O type solid electrolytes such as $Li_3PO_4$, LIPON (a compound obtained by substituting a part of O of $Li_3PO_4$ with N); Li—B—O type solid electrolytes such as $Li_3BO_3$, and a compound obtained by substituting a part of O of $Li_3BO_3$ with C.

Meanwhile, examples of the oxide solid electrolyte having sodium ion conductivity may include nasicon type solid electrolyte, perovskite type solid electrolyte, and β alumina. Also, examples of the nitride solid electrolyte having lithium ion conductivity may include $Li_3N$. Examples of the halide solid electrolyte having lithium ion conductivity may include LiCl, LiI, LiBr, and $Li_3YCl_6$.

Also, the polymer electrolyte preferably includes an ion conductive unit. Examples of the ion conductive unit may include polyethylene oxide, polypropylene oxide, polymethacrylic acid ester, polyacrylic acid ester, polydimethylsiloxane, polyacrylic acid, polymethacrylic acid, polyethylene vinyl acetate, polyimide, polyamine, polyamide, polyalkyl carbonate, polynitrile, polyphosphazene, polyolefin, and polydiene. The polymer electrolyte may include one kind or two kinds or more of the ion conductive unit. Also, the polymer electrolyte preferably includes the later described supporting salt. Also, a plastic crystal may be used as the polymer electrolyte.

Meanwhile, the liquid electrolyte preferably includes a supporting salt and a solvent. Incidentally, an ionic liquid may be used as the liquid electrolyte. Examples of the supporting salt (lithium salt) of the liquid electrolyte having lithium ion conductivity may include inorganic lithium salts such as $LiPF_6$, $LiBF_4$, $LiClO_4$, and $LiAsF_6$; and organic lithium salts such as $LiCF_3SO_3$, $LiN(CF_3SO_2)_2$, $LiN(C_2F_5SO_2)_2$, $LiN(FSO_2)_2$, and $LiC(CF_3SO_2)_3$. Meanwhile, examples of the supporting salt (sodium salt) of the liquid electrolyte having sodium ion conductivity may include inorganic sodium salts such as $NaPF_6$, $NaBF_4$, $NaClO_4$, and $NaAsF_6$; and organic sodium salts such as $NaCF_3SO_3$, $NaN(CF_3SO_2)_2$. $NaN(C_2F_5SO_2)_2$, $NaN(FSO_2)_2$, and $NaC(CF_3SO_2)_3$.

The solvent used for the liquid electrolyte is not particularly limited, and is preferably a mixed solvent including a high-permittivity solvent and a low-viscosity solvent. Examples of the high-permittivity solvent may include cyclic esters (cyclic carbonates) such as ethylene carbonate (EC), propylene carbonate (PC), and butylene carbonate (BC), γ-butyrolactone, sulfolane, N-methylpyrrolidone (NMP), and 1,3-dimethyl-2-imidazolidinone (DMI). Meanwhile, examples of the low-viscosity solvent may include chain esters (chain carbonates) such as dimethyl carbonate (DMC), diethyl carbonate (DEC), and ethylmethyl carbonate (EMC); acetates such as methyl acetate, and ethyl acetate; and ethers such as 2-methyltetrahydrofuran. Incidentally, the solvent used for the liquid electrolyte may be a non-aqueous solvent, and may be an aqueous solvent.

Also, the ionic liquid may be used as the liquid electrolyte or the solvent. The ionic liquid includes a cation part and an anion part. Examples of the cation part may include an organonitrogen based (such as imidazolium salt, ammonium salt, pyridinium salt and piperidinium salt), organophosphorous based (such as phosphonium salt), and organosulfur based (such as sulfonium salt). Meanwhile, examples of the anion part may include $AlCl_4^-$, $NO_2^-$, $NO_3^-$, $I^-$, $BF_4^-$, $PF_6^-$, $SbF_6^-$, $NbF_6^-$, $F(HF)_{2.3}^-$, $CH_3CO_2^-$, $CH_3SO_3^-$, $CF_3SO_3^-$, $(CF_3SO_2)_2N^-$, and $(FSO_2)_2N^-$.

Also, a solvated ionic liquid may be used as the liquid electrolyte. The solvated ionic liquid may be obtained by, for example, mixing glymes such as tetraglyme and triglyme with the above described supporting salt. The proportion of the glymes and the supporting salt is preferably, for example, approximately 1:1 in molar ratio.

The concentration of the supporting salt in the liquid electrolyte is, for example, 0.3 mol/l or more, may be 0.5 mol/l or more, and may be 0.8 mol/l or more. Meanwhile, the concentration of the supporting salt in the liquid electrolyte is, for example, 6 mol/l or less, and may be 3 mol/l or less. Also, in the present disclosure, the liquid electrolyte may be turned into a gel by adding a polymer. Examples of the polymer may include polyethylene oxide (PEO), polyacrylonitrile (PAN) or polymethylmethacrylate (PMMA), and polyvinylidene fluoride-hexafluoropropylene (PVDF-HFP).

Also, the electrolyte layer may include a separator. The material of the separator may be an organic material, and may be an inorganic material. Specific examples may include porous films such as polyethylene (PE), polypropylene (PP), cellulose, polyvinylidene fluoride, polyamide, and polyimide; nonwoven fabrics such as resin nonwoven fabric, and glass fiber nonwoven fabric; and ceramic porous films. Also, the separator may be a single layer structure, and may be a stacked structure.

The thickness of the electrolyte layer is, for example, 0.1 μm or more and 1000 μm or less. Incidentally, the electrolyte layer may include filler such as an inorganic particle and an organic particle.

4. Other Constitutions

The battery in the present disclosure comprises at least the above described anode layer, cathode layer, and electrolyte layer. Further, the battery in the present disclosure usually comprises a cathode current collector for collecting currents of the cathode layer and an anode current collector for collecting currents of the anode layer. Examples of the materials for the cathode current collector may include SUS, aluminum, nickel, iron, titanium, and carbon. Meanwhile, examples of the materials for the anode current collector may include SUS, copper, nickel, and carbon. Incidentally, the thickness and the shape of the cathode current collector and the anode current collector are preferably appropriately selected according to the use of the battery. Also, the cathode current collector and the anode current collector may respectively include a protecting layer on the electrolyte layer side surface. Examples of the protecting layer may include a carbon coating layer, a resin coating layer, and a metallic plating layer.

Also, the battery in the present disclosure may further include a confining jig that applies a confining pressure along the thickness direction, to the cathode layer, the electrolyte layer and the anode layer. A known jig may be used as the confining jig. The confining pressure is, for example, 0.1 MPa or more, may be 1 MPa or more, and may be 5 MPa or more. Meanwhile, the confining pressure is, for example, 100 MPa or less, may be 50 MPa or less, and may be 20 MPa or less.

5. Battery

The battery in the present disclosure is usually a battery in which a metallic ion is conducted between the cathode layer and the anode layer. Examples of such batteries may include a lithium ion battery, a sodium ion battery, a potassium ion battery, a magnesium ion battery, and a calcium ion battery. Also, the battery in the present disclosure may be a liquid battery in which the electrolyte layer includes a liquid electrolyte, and may be an all solid state battery in which the electrolyte layer includes a solid electrolyte.

Also, the battery in the present disclosure may be a primary battery and may be a secondary battery; above all, preferably the secondary battery so as to be repeatedly charged and discharged, and be useful as a car-mounted battery, for example. The secondary battery includes the use of a secondary battery as a primary battery (use for the purpose of the first charge only).

Also, the battery in the present disclosure may be a single cell battery and may be a stacked battery. The stacked battery may be a monopolar type stacked battery (a stacked battery connected in parallel), and may be a bipolar type stacked battery (a stacked battery connected in series). Examples of the shape of the battery may include a coin shape, a laminate shape, a cylindrical shape, and a square shape.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

Example 1

Synthesis of Anode Active Material

Figure 3:
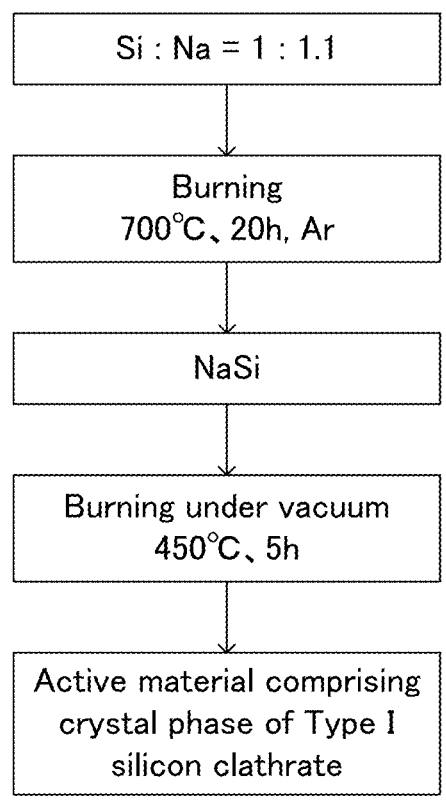
FIG. 3 is a flow diagram illustrating an example of a method for producing an active material in the present disclosure.

An anode active material was synthesized according to the flow shown in FIG. 3. Si particles (of the purity of 99.999%) and metallic Na (of the purity of 99.5%) were weighed so as to be Si particle: metallic Na=1:1.1 in the molar ratio, added to a crucible made of boron nitride, and sealed under Ar atmosphere. After that, a heat treatment was carried out under the following conditions; 700° C. for 20 hours. Thereby, NaSi compound (compound including Zintl phase) was obtained. The obtained NaSi compound was crushed and mixed, and a heat treatment was carried out under the following conditions; 450° C. for 5 hours under vacuum (approximately 0.1 Pa) so as to desorb Na. The obtained compound was crushed and mixed in a mortar. After that, the particle size was adjusted by classification, and anode active material particles (average secondary particle size=5 μm) were obtained.

Production of Evaluation Battery 0.4 g of solid electrolyte particles ($Li_3PS_4$), 0.8 g of the obtained anode active material particles, 0.06 g of a conductive material (VGCF), and 0.32 g of a binder solution (a butyl butyrate solution containing a PVDF-based resin of 5% by weight) were added to a container made of polypropylene. An ultrasonic treatment was carried out to the container by an ultrasonic dispersion apparatus for 30 seconds, a shaking treatment was carried out by using a shaker for 30 minutes, and slurry was obtained. The obtained slurry was pasted on an anode current collector (a Cu foil) by a blade method using an applicator, dried naturally for 60 minutes, and then, dried for 30 minutes on a hot plate adjusted to be 100° C. An anode structure including an anode layer and an anode current collector was obtained in the above manner.

Next, 0.3 g of solid electrolyte particles ($Li_3PS_4$), 2 g of cathode active material particles ($LiNi_{1/3}Co_{1/3}Mn_{1/3}O_2$), 0.03 g of a conductive material (VGCF), and 0.3 g of a binder solution (a butyl butyrate solution containing a PVDF-based resin of 5% by weight) were added to a container made of polypropylene. An ultrasonic treatment was carried out to the container by an ultrasonic dispersion apparatus for 30 seconds, a shaking treatment was carried out by using a shaker for 30 minutes, and slurry was obtained. The obtained slurry was pasted on a cathode current collector (an aluminum foil) by a blade method using an applicator, dried naturally for 60 minutes, and then, dried for 30 minutes on a hot plate adjusted to be 100° C. A cathode structure including a cathode layer and a cathode current collector was obtained in the above manner.

Next, 0.4 g of solid electrolyte particles ($Li_3PS_4$, average particle size $D_{50}$=2 μm), 0.05 g of a binder solution (a heptane solution containing an ABR based resin of 5% by weight) were added to a container made of polypropylene. An ultrasonic treatment was carried out to the container by an ultrasonic dispersion apparatus for 30 seconds, a shaking treatment was carried out by using a shaker for 30 minutes, and slurry was obtained. The obtained slurry was pasted on a support (an aluminum foil) by a blade method using an applicator, dried naturally for 60 minutes, and then, dried for 30 minutes on a hot plate adjusted to be 100° C. A solid electrolyte layer was formed in the above manner.

Next, the anode structure, the solid electrolyte layer, and the cathode structure were stacked in this order, the obtained stack was pressed under conditions of 130° C. and 200 MPa for 3 minutes, and an evaluation battery was obtained.

Comparative Example 1

Si particles (average secondary particle size=3 μm) including a crystal phase of a diamond-type were used as the anode active material for comparison. An evaluation battery was obtained in the same manner as in Example 1, except that this anode active material was used.

[Evaluation]

XRD Measurement

Figure 4A:
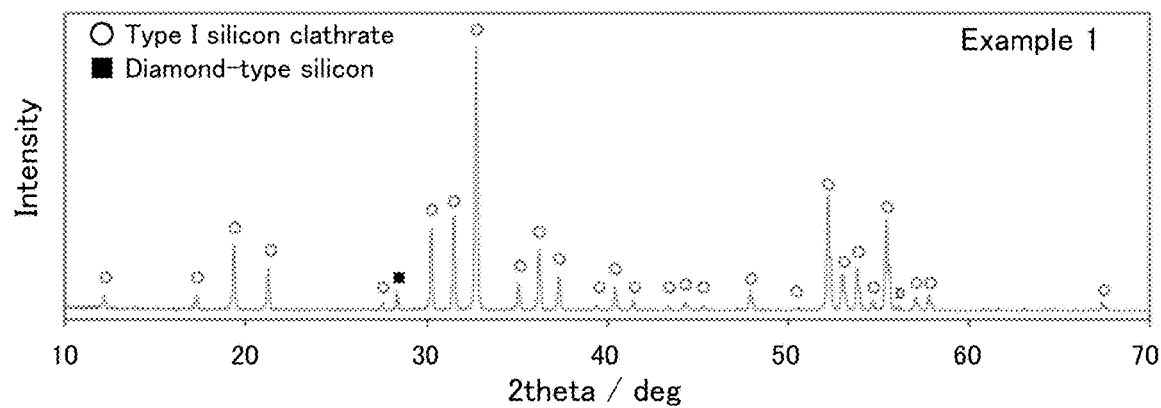
FIGS. 4A and 4B are the results of an XRD measurement for the anode active materials obtained in Example 1 and Comparative Example 1.
Figure 4B:
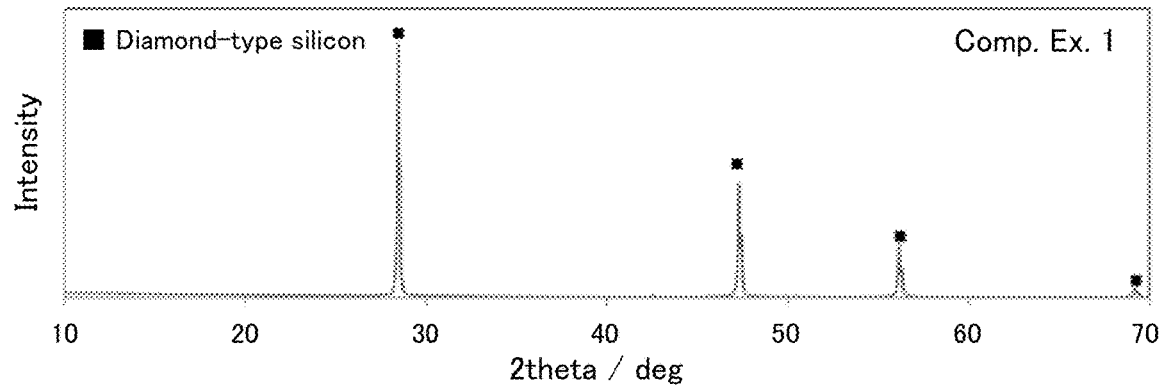

An X-ray diffraction (XRD) measurement using a CuKα ray was carried out for each anode active material obtained in Example 1 and Comparative Example 1. The results thereof are shown in FIGS. 4A and 4B. As shown in FIG. 4A, typical peaks of the crystal phase of Type I silicon clathrate were confirmed in Example 1 at positions of 2θ=19.44°, 21.32°, 30.33°, 31.60°, 32.82°, 36.29°, 52.39°, and 55.49°. Meanwhile, as shown in FIG. 4B, typical peaks of the Si crystal phase of the diamond-type were confirmed in Comparative Example 1.

Also, as shown in FIG. 4A, a peak of the Si crystal phase of the diamond-type was slightly confirmed in Example 1 at position of 2θ=28.44°. When the diffraction intensity of the peak at 2θ=32.82° in the crystal phase of Type I silicon clathrate is regarded as $I_A$, and the diffraction intensity of the peak at 2θ=28.44° in the Si crystal phase of the diamond-type is regarded as $I_B$, $I_B/I_A$ was 0.08.

SEM-EDX Measurement

A SEM-EDX (scanning electron microscope-energy dispersion type X-ray spectroscope) measurement was carried out for the anode active material obtained in Example 1 so as to measure Na/Si. As the result, Na/Si was 0.1. That is, it was confirmed that the anode active material obtained in Example 1 has the composition represented by $Na_{4.6}Si_{46}$.

TEM Observation

Figure 5A:
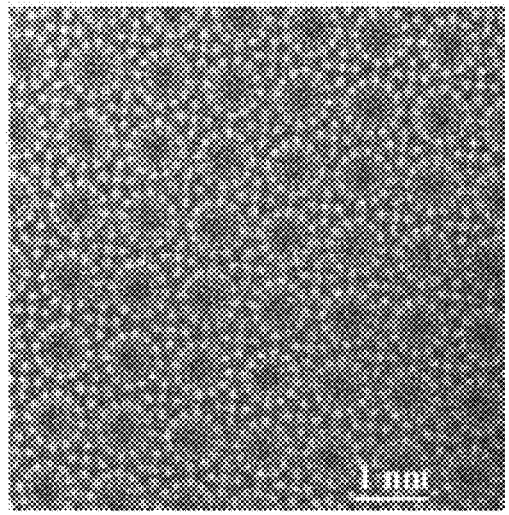
FIGS. 5A and 5B are the results of a TEM observation for the anode active material obtained in Example 1.
Figure 5B:
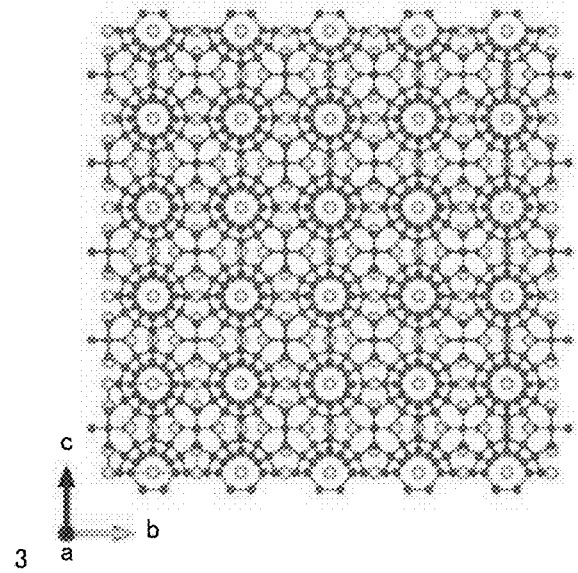

An observation with a transmission electron microscope (TEM) was carried out for the anode active material obtained in Example 1. The identification of the crystal phase of Type I silicon clathrate is possible by a TEM observation. An image obtained by Fourier transforming the diffraction spots is shown in FIG. 5A. The white spots in FIG. 5A indicate the positions of Si, and FIG. 5B corresponds to a crystal structural drawing of FIG. 5A. As shown in FIG. 5A and FIG. 5B, the space was spread out within the crystal structure, and it was suggested that, when Li is placed schematically, the Li is likely to enter the space within the crystal structure. Incidentally, from the TEM image, the primary particle size of the active material was approximately in a range of 100 nm to several μm. Also, the lattice constant of the crystal phase of Type I silicon clathrate was approximately 1.015 nm.

Charge and Discharge Test

Figure 6A:
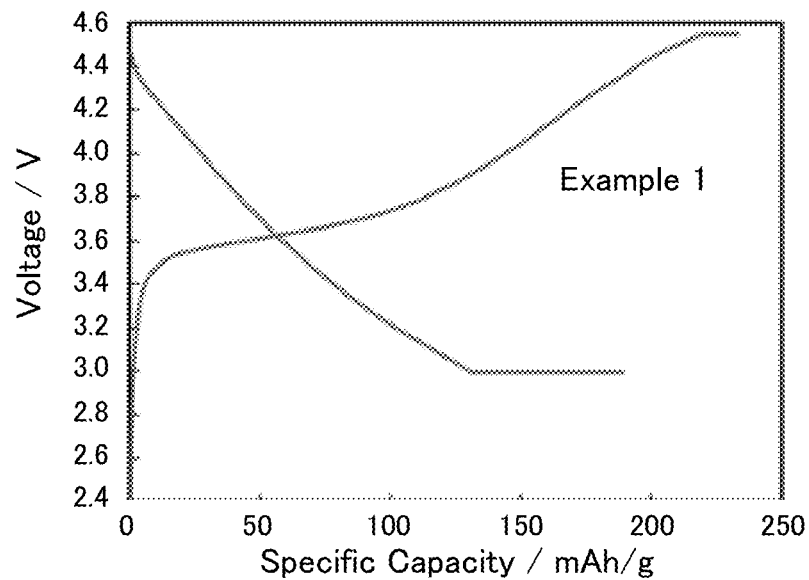
FIGS. 6A and 6B are the results of a charge/discharge test for the evaluation batteries obtained in Example 1 and Comparative Example 1.
Figure 6B:
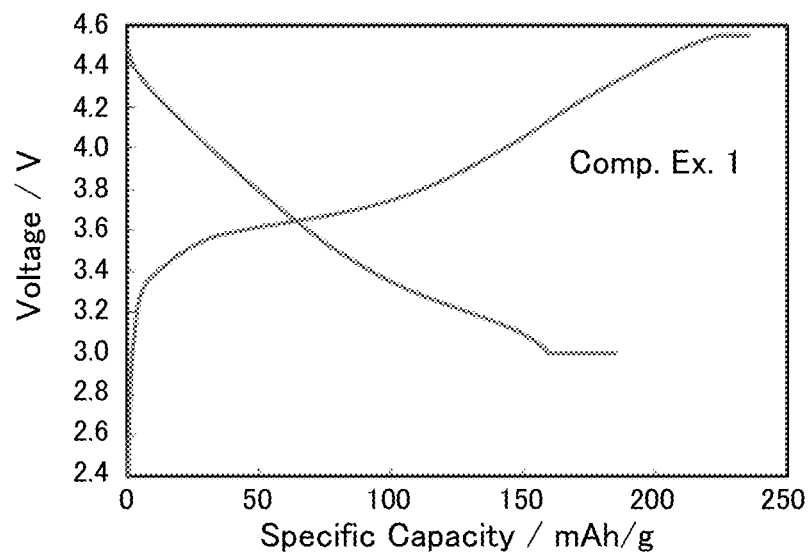
Figure 7:
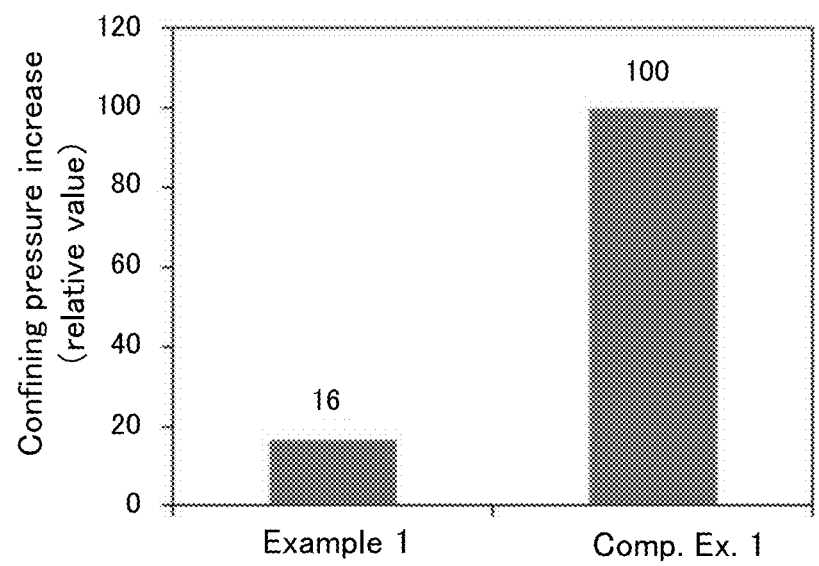
FIG. 7 is the result of the confining pressure increase for the evaluation batteries obtained in Example 1 and Comparative Example 1.

A charge and discharge test was carried out for each evaluation battery obtained in Example 1 and Comparative Example 1. The conditions for the charge and discharge test were: confining pressure (constant size) of 5 MPa, charging at 0.1 C, discharging at 1 C, and cutoff voltage of 3.0 V to 4.55 V, thus, the first time charging capacity and the first time discharging capacity were determined. The results are shown in FIGS. 6A and 6B and Table 1. Also, the confining pressure of the evaluation battery was monitored upon the first charge, the confining pressure at 4.55 V was measured, and the confining pressure increase was determined from the state before the charge and the discharge. The results are shown in FIG. 7 and Table 1. Incidentally, the results of the confining pressure increase in Table 1 are relative values when the result in Comparative Example 1 is regarded as 100.

TABLE 1

|  | First time charging capacity [mAh/g] | First time discharging capacity [mAh/g] | Confining pressure increase |
| --- | --- | --- | --- |
| Example 1 | 234 | 189 | 16 |
| Comp. Ex. 1 | 235 | 185 | 100 |

As shown in FIGS. 6A and 6B and Table 1, Example 1 and Comparative Example 1 showed much the same charge/discharge behavior. That is, it was confirmed that the active material in the present disclosure had similar properties as the conventional Si particles. In contrast, as shown in FIG. 7 and Table 1, it was confirmed that Example 1 was notably low in the confining pressure increase, that is, notably low in the volume variation compared to Comparative Example 1.

Also, five cycles of charge and discharge were carried out for each evaluation battery obtained in Example 1 and Comparative Example 1 under the following conditions: confining pressure (constant size) of 5 MPa, charging at ⅓ C, discharging at ⅓ C, and cutoff voltage of 3.0 V to 4.55 V. Thus, the charging capacity and the discharging capacity of fifth cycle were determined. The results are shown in Table 2. Also, the confining pressure of the evaluation battery was monitored upon the charge of the fifth cycle, the confining pressure at 4.55 V was measured, and the confining pressure increase was determined from the state before the charge and the discharge. The results are shown in Table 2. Incidentally, the results of the confining pressure increase in Table 2 are relative values when the result in Comparative Example 1 is regarded as 100.

TABLE 2

|  | Charging capacity of fifth cycle [mAh/g] | Discharging capacity of fifth cycle [mAh/g] | Confining pressure increase |
| --- | --- | --- | --- |
| Example 1 | 160 | 155 | 50 |
| Comp. Ex. 1 | 158 | 153 | 100 |

Figure 8A:
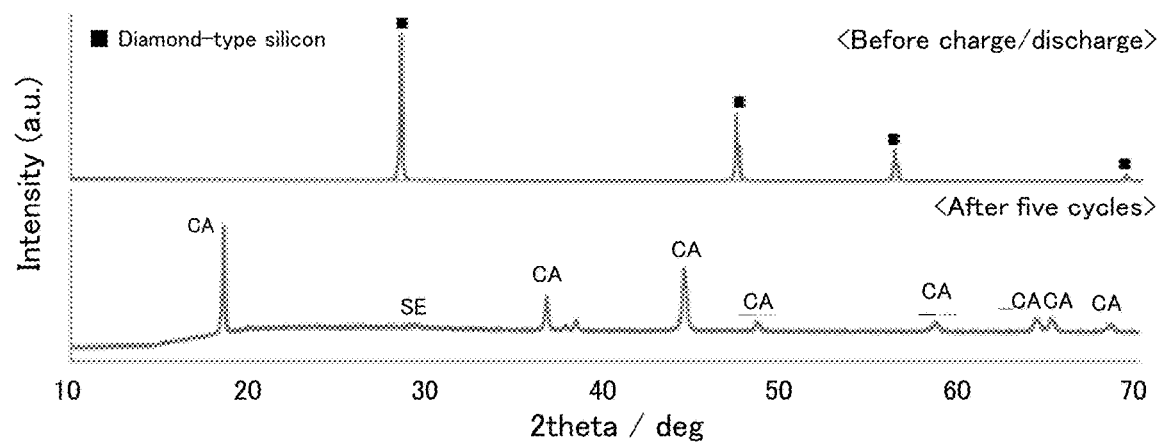
FIGS. 8A and 8B are the results of an XRD measurement for the evaluation batteries obtained in Example 1 and Comparative Example 1.
Figure 8B:
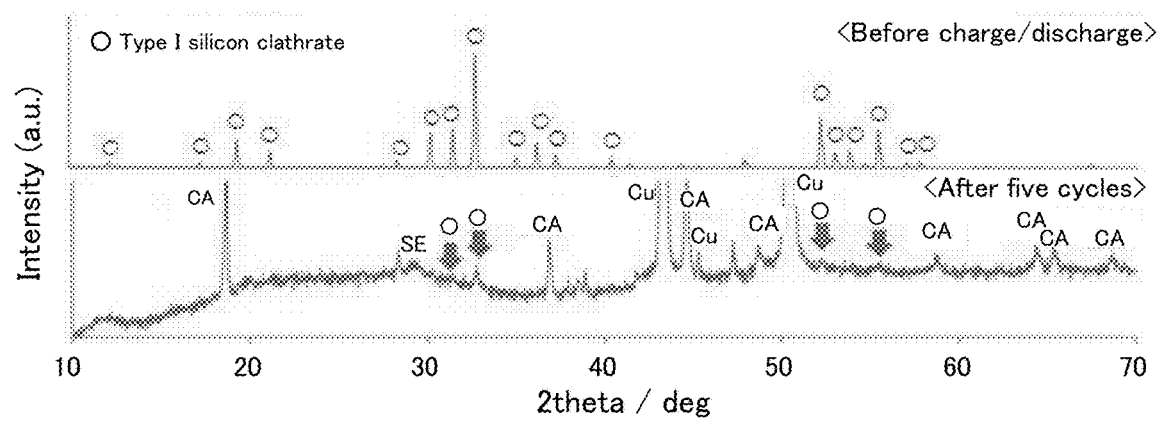

As shown in Table 2, also after five cycles, it was confirmed that Example 1 was notably low in the confining pressure increase, that is, notably low in the volume variation compared to Comparative Example 1. Also, an XRD measurement was carried out in a glove box of Ar atmosphere for each evaluation battery disassembled after five cycles. The results are shown in FIGS. 8A and 8B. Incidentally, for FIGS. 8A and 8B respectively, the result of XRD measurement for the anode active material before charge/discharge is shown at the top, and the result of XRD measurement for the evaluation battery after five cycles is shown at the bottom. Also, in FIGS. 8A and 8B, CA indicates a cathode active material, SE indicates a solid electrolyte, and Cu indicates a cupper foil.

As shown in FIG. 8A, in Comparative Example 1, the peaks deriving from the anode active material (Si particles including a crystal phase of a diamond-type) have completely disappeared due to five cycles of charge/discharge, and it was confirmed that the anode active material was amorphized. Since the amorphous is generally lower in the density than the crystal, it is thought to be a cause of the increase of the volume variation due to charge/discharge.

In contrast, as shown in FIG. 8B, in Example 1, the peaks deriving from the anode active material (active material including the crystal phase of Type I silicon clathrate) were confirmed even after five cycles of charge/discharge. The reason therefor is thought that the amorphization was suppressed since the stress applied to Si—Si bonding was released by intercalating and desorbing Li utilizing the space within the crystal phase of Type I silicon clathrate. Therefore, as shown in Table 2, the confining pressure increase in Example 1 is assumed to be suppressed.

Example 2

Si particles (of the purity of 99.999%) and metallic Na (of the purity of 99.5%) were weighed so as to be Si particle: metallic Na=1:1.1 in the molar ratio, added to a crucible made of boron nitride, and sealed under Ar atmosphere. After that, a heat treatment was carried out at the conditions of 700° C. for 20 hours. Thereby, NaSi compound (Zintl) was obtained. The obtained NaSi compound was crushed and mixed, and a heat treatment was carried out at the conditions of 400° C. for 5 hours under vacuum (approximately 0.05 Pa) so as to desorb Na. The obtained compound was crushed and mixed in a mortar, and an active material was obtained. An evaluation battery was obtained in the same manner as in Example 1, except that the obtained active material was used.

[Evaluation]

XRD Measurement

Figure 9:
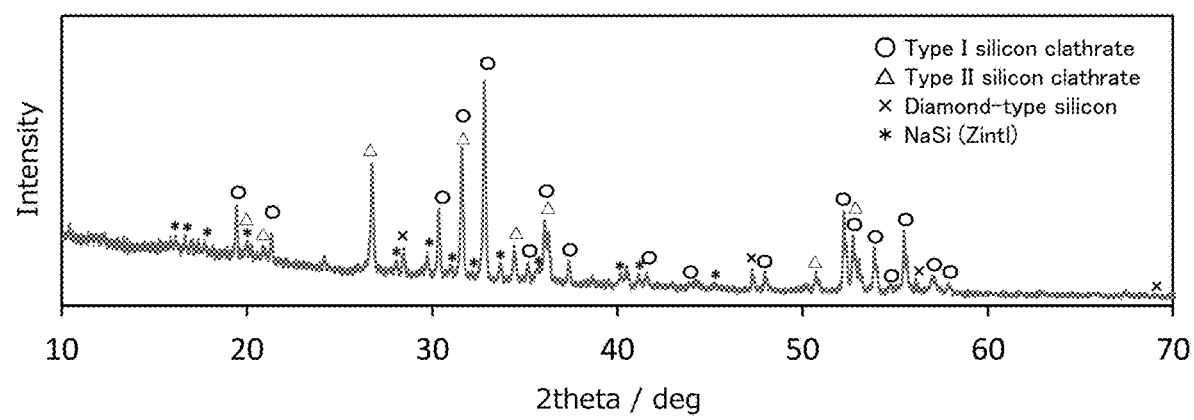
FIG. 9 is the result of an XRD measurement for the anode active material obtained in Example 2.

An X-ray diffraction (XRD) measurement using a CuKα ray was carried out for the anode active material obtained in Example 2. The result thereof is shown in FIG. 9. As shown in FIG. 9, similar to the anode active material obtained in Example 1, it was confirmed that the anode active material obtained in Example 2 comprises the crystal phase of Type I silicon clathrate as a main crystal phase. Meanwhile, for the anode active material obtained in Example 2, the peaks of the crystal phase of Type II silicon clathrate, the Si crystal phase of the diamond-type, and the Zintl phase were also confirmed. As described above, it was suggested that the active material in the present disclosure is easily influenced by the manufacturing conditions.

Comparative Example 2

Si particles (of the purity of 99.999%) and metallic Na (of the purity of 99.5%) were weighed so as to be Si particle: metallic Na=1:1.1 in the molar ratio, added to a crucible made of boron nitride, and sealed under Ar atmosphere. After that, a heat treatment was carried out at the conditions of 700° C. for 20 hours. Thereby, NaSi compound (a compound including Zintl phase) was obtained. The obtained NaSi compound was crushed and mixed, and heated under the following conditions; under vacuum (approximately 0.1 Pa) and rate of temperature increase of 15° C./min. Na was desorbed by heat treating for 5 hours after reaching the temperature of 400° C. The obtained compound was crushed and mixed in a mortar. After that, the particle size was adjusted by classification, and anode active material particles A (average secondary particle size=5 μm) and anode active material particles B (average secondary particle size=3 μm) were obtained.

Next, 0.4 g of solid electrolyte particles ($Li_3PS_4$), 0.8 g of the obtained anode active material particles A, 0.06 g of a conductive material (VGCF), and 0.32 g of a binder solution (a butyl butyrate solution containing a PVDF-based resin of 5% by weight) were added to a container made of polypropylene. An ultrasonic treatment was carried out to the container by an ultrasonic dispersion apparatus for 30 seconds, a shaking treatment was carried out by using a shaker for 30 minutes, and slurry A with relatively high anode active material content was obtained.

Also, 0.7 g of solid electrolyte particles ($Li_3PS_4$), 0.6 g of the obtained anode active material particles B, 0.06 g of a conductive material (VGCF), and 0.24 g of a binder solution (a butyl butyrate solution containing a PVDF-based resin of 5% by weight) were added to a container made of polypropylene. An ultrasonic treatment was carried out to the container by an ultrasonic dispersion apparatus for 30 seconds, a shaking treatment was carried out by using a shaker for 30 minutes, and slurry B with relatively low anode active material content was obtained.

Slurry A was pasted on an anode current collector (a copper foil) by a blade method using an applicator, dried naturally for 60 minutes. After that, slurry B was pasted on the dried film by a blade method using an applicator, dried naturally for 60 minutes. Then, the obtained laminate was dried for 30 minutes on a hot plate adjusted to be 100° C. An anode structure including anode layers and an anode current collector was obtained in the above manner. An evaluation battery was obtained in the same manner as in Example 1, except that the obtained anode structure was used.

Examples 3 to 5, Comparative Examples 3 and 4

Evaluation batteries were obtained in the same manner as in Comparative Example 2, except that the conditions of the vacuum heat treatment were changed to those shown in Table 3.

[Evaluation]
XRD Measurement

Figure 10:
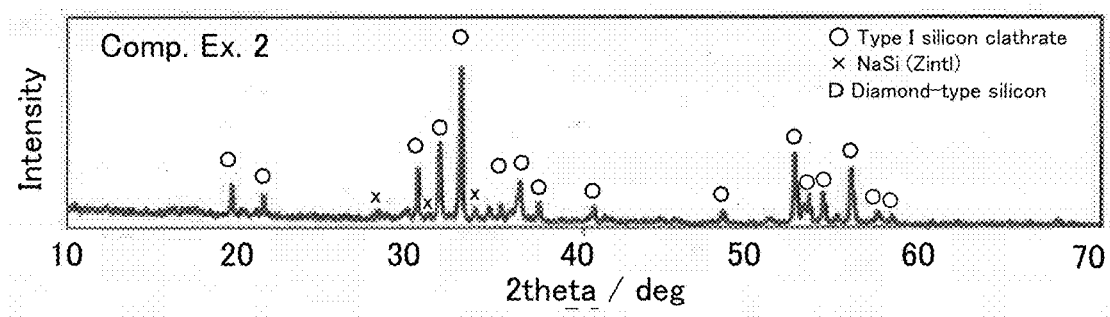
FIG. 10 is the result of an XRD measurement for the anode active material obtained in Comparative Example 2.
Figure 11:
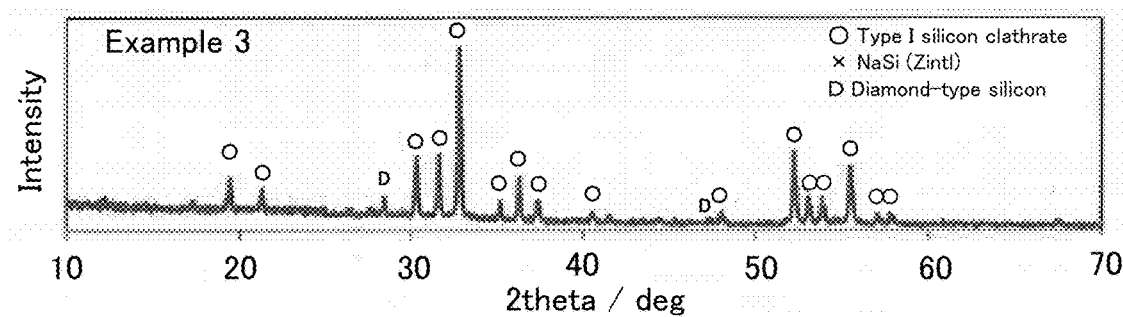
FIG. 11 is the result of an XRD measurement for the anode active material obtained in Example 3.
Figure 12:
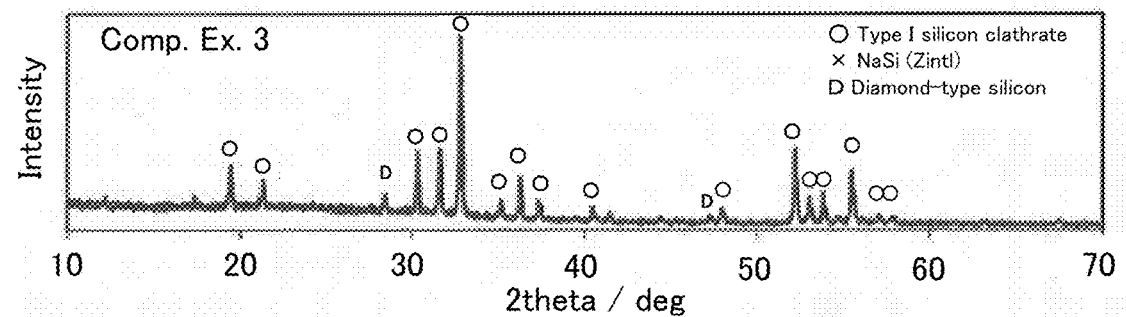
FIG. 12 is the result of an XRD measurement for the anode active material obtained in Comparative Example 3.
Figure 13:
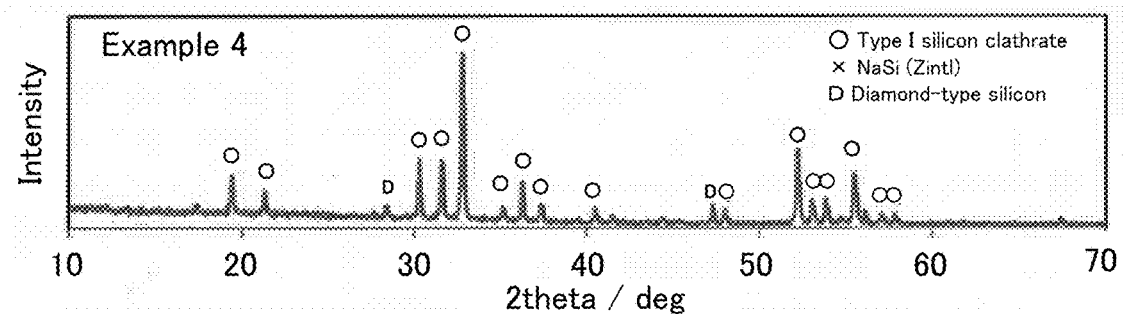
FIG. 13 is the result of an XRD measurement for the anode active material obtained in Example 4.
Figure 14:
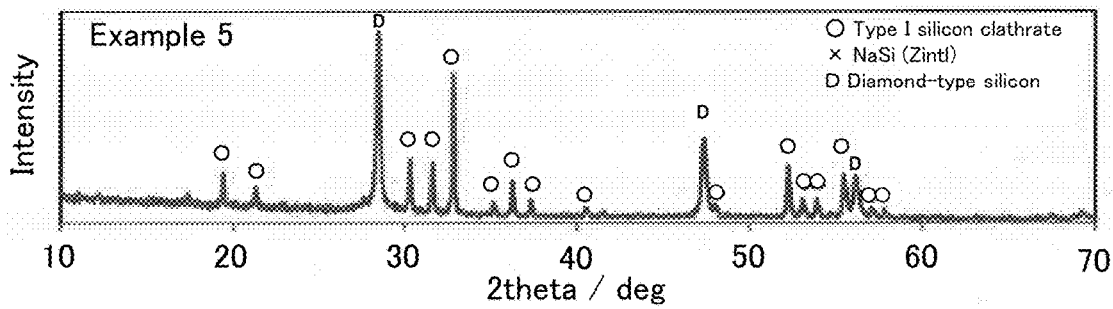
FIG. 14 is the result of an XRD measurement for the anode active material obtained in Example 5.

An X-ray diffraction (XRD) measurement using a CuKα ray was carried out for each anode active material obtained in Examples 3 to 5 and Comparative Examples 2 to 4. The results thereof are shown in FIGS. 10 to 15. As shown in FIG. 10, the peaks of the crystal phase of Type I silicon clathrate were confirmed in Comparative Example 2, and simultaneously, the peaks of the Zintl phase were slightly confirmed. Meanwhile, the peaks of the Si crystal phase of the diamond-type were not confirmed in Comparative Example 2. Also as shown in FIGS. 11 to 13, the peaks of the crystal phase of Type I silicon clathrate were confirmed in each of Examples 3 and 4 and Comparative Example 3, and simultaneously, the peaks of the Si crystal phase of the diamond-type were slightly confirmed. Further, in Example 5, the peaks of the crystal phase of Type I silicon clathrate and the peaks of the Si crystal phase of the diamond-type were confirmed. Meanwhile, in Comparative Example 4, although the peaks of the Si crystal phase of the diamond-type were confirmed, the peaks of the crystal phase of Type I silicon clathrate were not confirmed. Also, based on each chart, the value of $I_B/I_A$ was determined. The results thereof are shown in Table 3.

SEM-EDX Measurement

A SEM-EDX (scanning electron microscope-energy dispersion type X-ray spectroscope) measurement was carried out for each anode active material obtained in Examples 3 to 5 and Comparative Examples 2 to 4 so as to measure Na/Si. Na/Si was calculated from the ratio of the number of atoms based on the signal intensity ratio of Na and Si according to EDX analysis. From Na/Si, x in $Na_xSi_{46}$ was determined. The results thereof are shown in Table 3.

Charge and Discharge Test

Figure 16:
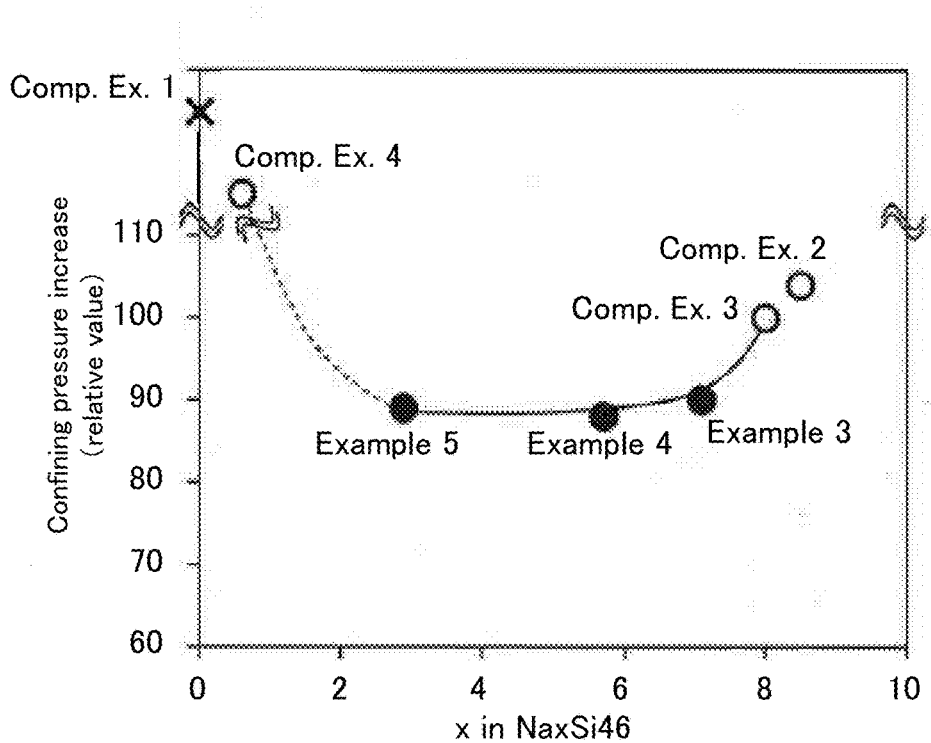
FIG. 16 is a graph showing the relationship between Na amount x and confining pressure increase.

A charge and discharge test was carried out for each evaluation battery obtained in Examples 3 to 5 and Comparative Examples 2 to 4. The conditions for the charge and discharge test were: confining pressure (constant size) of 5 MPa, charging at 0.1 C, discharging at 1 C, and cutoff voltage of 3.0 V to 4.55 V, thus, the first time charging capacity and the first time discharging capacity were determined. The results thereof are shown in Table 3. Also, the confining pressure of the evaluation battery was monitored upon the first charge, the confining pressure at 4.55 V was measured, and the confining pressure increase was determined from the state before the charge and the discharge. The results thereof are shown in Table 3. Incidentally, the results of the confining pressure increase in Table 3 are relative values when the result in Comparative Example 3 is regarded as 100. Also, the relationship between Na content x and the confining pressure increase is shown in FIG. 16.

TABLE 3

| | Vacuum heat treatment | | | | Confining pressure increase | First time charging capacity [mAh/g] | First time discharging capacity [mAh/g] |
| --- | --- | --- | --- | --- | --- | --- | --- |
| | Temperature [° C.] | Time [h] | x in $Na_xSi_{46}$ | $I_B/I_A$ | | | |
| Comp. Ex. 2 | 400 | 5 | 8.5 | 0.02 | 104 | 239 | 194 |
| Example 3 | 400 | 12 | 7.1 | 0.08 | 90 | 236 | 191 |
| Comp. Ex. 3 | 450 | 5 | 8.0 | 0.06 | 100 | 233 | 188 |

TABLE 3-continued

| | Vacuum heat treatment | | | | Confining pressure increase | First time charging capacity [mAh/g] | First time discharging capacity [mAh/g] |
|---|---|---|---|---|---|---|---|
| | Temperature [° C.] | Time [h] | x in NaxSi46 | $I_B/I_A$ | | | |
| Example 4 | 450 | 12 | 5.7 | 0.04 | 88 | 234 | 187 |
| Example 5 | 500 | 5 | 2.9 | 1.2 | 89 | 232 | 187 |
| Comp. Ex. 4 | 550 | 5 | 0.6 | — | 431 | 237 | 192 |
| Comp. Ex. 1 | — | — | 0 | — | 625 | 235 | 185 |

Figure 15:
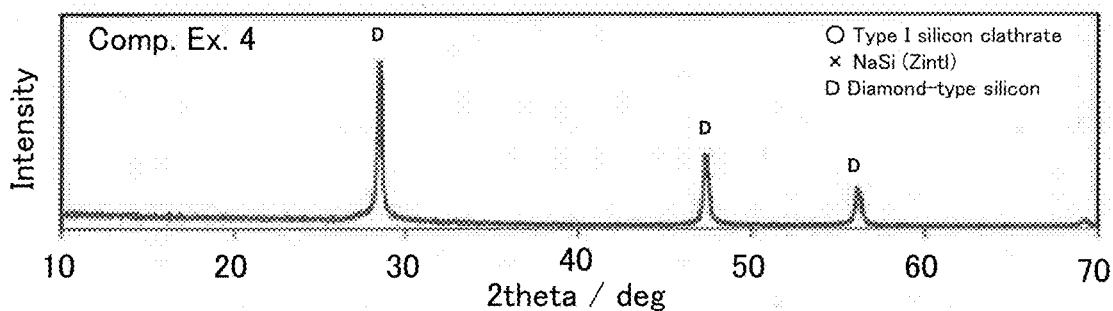
FIG. 15 is the result of an XRD measurement for the anode active material obtained in Comparative Example 4.

As shown in Table 3, for Examples 3 to 5 and Comparative Examples 2 to 4, the charging capacity and the discharging capacity were much the same as Comparative Example 1. That is, it was confirmed that each active material obtained in Examples 3 to 5 and Comparative Examples 2 to 4 had similar properties as the conventional Si particles. Also, as shown in Table 3 and FIG. 16, it was confirmed that the confining pressure increase was low, that is, the volume variation was low in each of Examples 3 to 5, compared to Comparative Examples 2 to 4. The reason for the confining pressure increase in Example 3 was lower than the confining pressure increase in Comparative Examples 2 and 3 is assumed that the volume variation as the anode active material was suppressed since Li was intercalated into a site where Na is to be located in the crystal structure of Type I silicon clathrate. Meanwhile, it is assumed that the reason for the confining pressure increase in Comparative Example 4 being higher than the confining pressure increase in Example 5 is because the deposition of the Si crystal phase of the diamond-type has occurred instead of the crystal phase of Type I silicon clathrate, as shown in FIG. 15.

REFERENCE SIGNS LIST

1 cathode layer
2 electrolyte layer
3 anode layer
4 cathode current collector
5 anode current collector
10 battery

The invention claimed is:

1. An active material having a composition represented by $Na_xM_ySi_{46}$, wherein M is a metal element other than Na, x and y satisfy $0<x, 0 \leq y, y \leq x$ and $0<x+y<8$, and
comprising a crystal phase of a Type I silicon clathrate.

2. The active material according to claim 1, wherein the active material comprises the crystal phase of the Type I silicon clathrate as a main phase.

3. The active material according to claim 1, wherein the crystal phase of the Type I silicon clathrate has a peak at a position of $2\theta=30.33°\pm1.00°$, $31.60°\pm1.00°$, $32.82°\pm1.00°$, $52.39°\pm1.00°$ and $55.49°\pm1.00°$ in X-ray diffraction measurement using a CuKα ray.

4. The active material according to claim 1, wherein the active material does not comprise a Si crystal phase of a diamond-type,
the Si crystal phase of the diamond-type has a peak at a position of $2\theta=28.44°\pm1.00°$ in X-ray diffraction measurement using a CuKα ray, and
when a diffraction intensity of the peak at $2\theta=32.82°\pm1.00°$ is regarded as $I_A$, and a diffraction intensity of the peak at $2\theta=28.44°\pm1.00°$ is regarded as $I_B$, $I_B/I_A$ is more than 0, and 0.1 or less.

5. The active material according to claim 3, wherein the active material comprises a Si crystal phase of a diamond-type,
the Si crystal phase of the diamond-type has a peak at a position of $2\theta=28.44°\pm1.00°$ in X-ray diffraction measurement using a CuKα ray, and
when a diffraction intensity of the peak at $2\theta=32.82°\pm1.00°$ is regarded as $I_A$, and a diffraction intensity of the peak at $2\theta=28.44°\pm1.00°$ is regarded as $I_B$, $I_B/I_A$ is more than 0, and 0.1 or less.

6. The active material according to claim 1, wherein the x and the y satisfy $2.9 \leq x, 2.9 \leq x+y \leq 7.1$.

7. A battery comprising a cathode layer, an electrolyte layer, and an anode layer, in this order, and
the anode layer includes the active material according to claim 1.

8. The battery according to claim 7, wherein the electrolyte layer includes an inorganic solid electrolyte.

9. The battery according to claim 7, wherein the electrolyte layer includes a liquid electrolyte.

10. The battery according to claim 7, wherein the battery is a lithium ion battery.

11. The battery according to claim 7, wherein the battery is a sodium ion battery.

* * * * *